Patented Apr. 21, 1942

2,280,507

UNITED STATES PATENT OFFICE 2,280,507

PHTHALOCYANINE DYESTUFFS

Berthold Bienert and Sebastian Gassner, Leverkusen-I. G.-Werk, Germany, assignors to General Aniline & Film Corporation, New York, N. Y., a corporation of Delaware No Drawing. Application August 2, 1940, Serial No. 350,130. In Germany October 23, 1935

8 Claims. (Cl. 260—314)

The present invention relates to new pigments of the phthalocyanine series.

Phthalocyanines represent a new class of pigment dyestuffs which can be prepared in various ways, f. i. by heating an ortho-dihalogenbenzene or an ortho halogen-nitrile of the benzene series with cuprous cyanide or by heating o-dinitriles of the benzene series with copper or copper salts. The compounds which are obtainable according to the said processes are characterized by their containing copper in chemical combination. In a similar manner phthalocyanines containing other polyvalent metals than copper can be prepared. Also metalfree phthalocyanines have been prepared either by removing from the phthalocyanines those metals which are relatively loosely bound, such as magnesium, or by heating ortho-dinitriles of the benzene series with an alkali metal alcoholate followed by a hydrolysis of the alkali metal compound thus formed. The sulfonic acids of such phthalocyanine dyestuffs are partly suitable for the dyeing of cellulosic materials and mostly represent valuable starting materials for the preparation of color lakes by converting the same into their earth alkali metal salts.

Most of the hitherto known phthalocyanines show clear blue shades and part of them are characterized by their excellent fastness properties. As far as within the phthalocyanine series products of green coloration have been obtained, they are relatively dull in shades or show insufficient fastness properties. It is, therefore, a problem to prepare phthalocyanines which combine a clear green shade with the fastness properties of f. i. a copper phthalocyanine of the benzene series.

The present invention is based upon the discovery that phthalocyanines of clear green to greenish-blue shades can be obtained by introducing phenyl groups into the benzene nuclei. In accordance therewith our invention is concerned with phthalocyanines containing a phenyl group as a substituent on each of their four benzene nuclei. These new phthalocyanines can be prepared in a manner known per se by starting from ortho-dinitriles of the diphenyl series. Furthermore, such compounds can be employed as starting materials as are capable of being transformed into ortho-dinitriles in the course of the reaction; examples for such compounds are ortho-halogennitriles and ortho-dihalogen compounds of the diphenyl series, which, upon the action of certain metal cyanides, such as f. i. of cuprous cyanide, are transformed into ortho-dinitriles and then into phthalocyanines. As to the various methods of preparing phthalocyanines from ortho-dinitriles reference is made to what is stated above with respect to the prior art. We, therefore, confine ourselves to state that copper salts or free copper are preferred reagents for preparing phthalocyanines and that the reaction may be performed in the presence of solid diluents such as sodium sulfate or of liquid diluents such as pyridine, quinoline, benzophenone, nitrobenzene or ortho-dichlorobenzene.

The new phthalocyanines which are obtainable in accordance with this invention generally show very clear green to greenish-blue shades. Therefore, and in view of the excellent fastness properties they represent valuable pigment dyestuffs and can be employed, f. i., for graphic prints, for wall-paper and for dyeing artificial silk in the mass. Our new phthalocyanines may contain various other substituents without departing from the scope of this invention. Thus, they may be substituted by halogen atoms, which can be introduced either into the starting materials or into the ready-made phthalocyanines. All these new compounds may be pasted by dissolving the same in sulfuric acid monohydrate or in ethyl sulfuric acid with subsequent precipitation in water; sulfuric acid monohydrate is preferred in the case of compounds which, owing to the presence of substituents, are not capable of being sulfurized. In this manner, the phthalocyanines are converted into a finely dispersed state.

Among the substitution products of our new phthalocyanines particular importance is attached to the sulfonic acids which can easily be obtained by the action of sulfuric acid monohydrate or fuming sulfuric acid. These sulfonic acids are soluble in water and can be converted into new pigment dyestuffs by treating the same with salts of polyvalent metals or with lake forming amines. Among the sulfonic acids those of the copper and tin phthalocyanines and of the metal free product have proved to be best suitable as regards the fastness properties and the brightness of shade. These color lakes are superior to the unsulfonated pigment dyestuffs as to the fastness towards organic solvents. In the case of the metal free tetraphenylphthalocyanines such color lakes even show an improved fastness to light when compared with the non-sulfonated pigment. The sulfonation can be affected by merely dissolving the starting materials in sulfuric acid monohydrate, then pouring the solution into a dilute sodium chloride solution and washing the precipitate with water until neutral. It contains 4 sulfonic acid groups in the average it being assumed that each of the external phenyl groups contains one of the sulfonic acid groups. In case a higher number of sulfonic acid groups is desired we prefer to work with oleum at a somewhat higher temperature of say about 60 to 70° C. With the tetraphenylcopperphthalocyanine the best result has been obtained in case 5 or at the most 6 sulfonic acid groups have been introduced whereas in the case of the other products the optimum properties are already reached with about 4 sulfonic acid groups. An increase of the number of sulfonic acid groups over six generally results in a loss of brightness so that nothing is gained by the introduction of 7 or more such groups. The color lakes can be prepared from such sulfonic acids in a manner known per se, see for instance the U. S. Patent No. 2,099,689 to Karl Holzach and Georg Niemann.

The following examples illustrate the invention without, however, restricting it thereto the parts being by weight:

*Example 1*

8.16 parts of 4-phenylphthalonitrile are added at 70° C. to a solution consisting of 0.46 part of sodium in 41 parts of amyl alcohol, whereupon the mixture is heated to boiling for 2-3 hours while refluxing. The precipitating dyestuff is sucked off, rinsed with alcohol and purified by extraction with hot alcohol. The product thus obtained in a good yield is dissolved in ethyl sulfuric acid and precipitated by introduction into a 80% dilute acetic acid. On filtering, rinsing with water and drying a dyestuff of a clear, brilliant green shade is obtained. The metal-free product thus formed is especially suitable as pigment dyestuff. By dissolution in sulfuric acid monohydrate or fuming sulfuric acid followed by precipitation by means of a sodium chloride solution, the product is converted into its tetrasulfonic acid which upon transformation into an earth alkali metal salt can likewise be employed as pigment dyestuff, this color lake being distinguished by a very bright shade.

*Example 2*

10 parts of 3.4-dicyanodiphenyl (4-phenylphthalonitrile) and 40 parts of cuprous chloride are heated in the presence of small quantities of pyridine for 20-25 minutes to 200-210° C. On cooling the mixture obtained is pulverized and boiled with alcohol and hydrochloric acid. The phthalocyanine obtained as residue in a good yield represents an amorphous dark-green powder, which, when applied as pigment dyestuff, is distinguished by its clear green shade and excellent fastness to light. In order to convert the product into a finely dispersed state it can be dissolved in quinoline and precipitated by introducing it into hydrochloric acid.

The same product is obtained by heating for 1 hour to 180° C. an intimate mixture of 10 parts of 3.4-dicyanodiphenyl and 5 parts of cuprous chloride together with 40 parts of water-free sodium sulfate. The product is worked up in the usual manner by mixing with water and boiling with hydrochloric acid and dilute sodium lye. The residue thus obtained represents the practically pure copper complex.

The product thus obtained is converted into a sulfonic acid by a 5 hours' heating to about 70° C. with a 30% oleum. The sulfonic acid thus obtained contains 5 sulfonic acid groups in the average, the color lakes which are obtainable therefrom showing excellent properties. In case a stronger oleum is employed the number of sulfonic acid groups can be still further increased.

*Example 3*

60 parts of quinoline and 20 parts of 3.4-dicyanodiphenyl are heated together with 20 parts of water-free stannous chloride for 1 hour to 180-200° C. The dyestuff thus obtained forms a double compound with quinoline and crystallizes in a good yield in form of small needles, which are purified by sucking off and rinsing with pyridine and alcohol. On dissolving in ethyl sulfuric acid and pouring into water a clear green dyestuff is separated which is now free from quinoline.

The tetrasulfonic acid of the tetraphenyl-(4)-tin phthalocyanine thus obtained is a very clear yellowish-green lacquer-dyestuff of excellent fastness to light. It can be prepared in the same manner as described above in Example 1.

*Example 4*

20.5 parts of a water-free aluminum chloride are gradually added while stirring into a solution consisting of 41 parts of 3.4-dicyanodiphenyl in 205 parts of quinoline, whereupon the whole is heated for about 2 hours to 200° C. and then for another 2 hours to 220° C. On working up the green reaction mixture as described in Example 5 a green pigment dyestuff is obtained in an excellent yield which may be converted into the corresponding sulfonic acids by treating it with sulphonating agents in the usual manner.

*Example 5*

205 parts of quinoline, 41 parts of 3.4-dicyanodiphenyl and 23 parts of water-free iron chloride are heated while stirring for about 2 hours to 230-235° C. The still hot reaction mixture is introduced into dilute hydrochloric acid while stirring, whereupon the dyestuff is filtered, rinsed and, for further purification, boiled with dilute sodium lye and alcohol.

A dark-green powder is thus obtained which is soluble in pyridine with a bluish-green shade. When treating it with sulfuric acid monohydrate it is converted into a sulfonic acid which yields on the addition of dilute sodium lye and hydrosulfite a brownish-red vat.

This application is a continuation in part of our U. S. Patent No. 2,213,517, filed October 21, 1936.

We claim:

1. A sulfonic acid of a phthalocyanine containing a phenyl group as a substituent on each of its four benzene nuclei this product having been obtained by sulfonating a phthalocyanine containing a phenyl group as a substituent on each of its 4 benzene nuclei.

2. A product as claimed in claim 1 wherein the number of sulfonic acid groups is about 4 to about 6.

3. A sulfonic acid of a metal-free phthalocyanine containing a phenyl group as a substituent on each of its four benzene nuclei this product having been obtained by sulfonating a metal-free phthalocyanine containing a phenyl group as a substituent on each of its 4 benzene nuclei.

4. A sulfonic acid of a tin phthalocyanine containing a phenyl group as a substituent on each of its four benzene nuclei this product having been obtained by sulfonating a tin phthalocyanine containing a phenyl group as a substituent on each of its 4 benzene nuclei.

5. A sulfonic acid of a copper phthalocyanine containing a phenyl group as a substituent on each of its four benzene nuclei this product having been obtained by sulfonating a copper phthalocyanine containing a phenyl group as a substituent on each of its 4 benzene nuclei.

6. A product as claimed in claim 3 wherein the number of sulfonic acid groups is about 4.

7. A product as claimed in claim 4 wherein the number of sulfonic acid groups is about 4.

8. A product as claimed in claim 5 wherein the number of sulfonic acid groups is about 5.

BERTHOLD BIENERT.
SEBASTIAN GASSNER.